Aug. 20, 1968  G. B. LOPER  3,397,755
PNEUMATIC SEISMIC SOURCE
Filed March 14, 1966  3 Sheets-Sheet 1
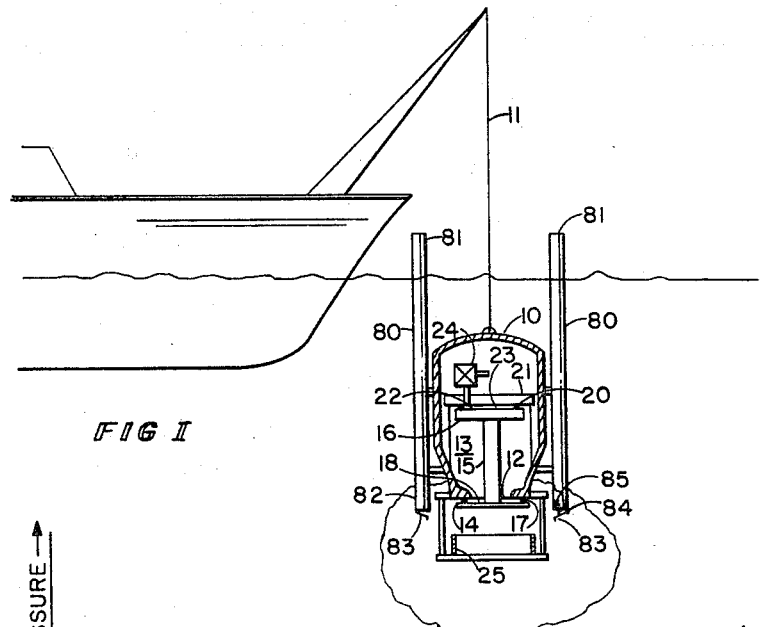
FIG I
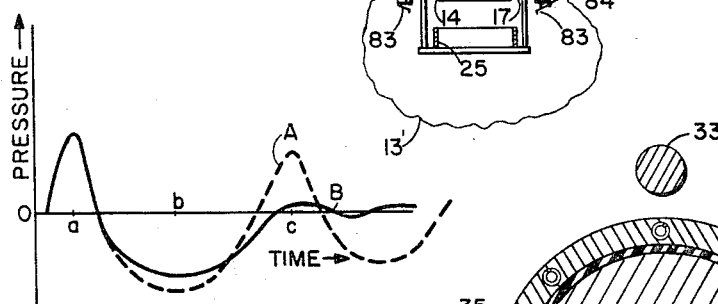
FIG III
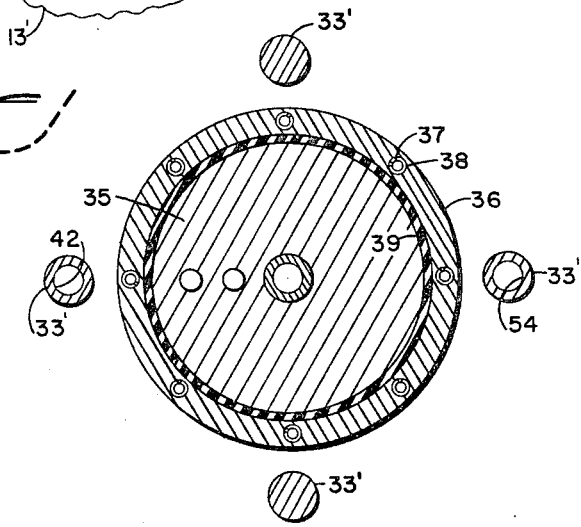
FIG IV
INVENTOR
GEORGE B. LOPER
BY Arthur F Zobal Aug. 20, 1968  G. B. LOPER  3,397,755
PNEUMATIC SEISMIC SOURCE
Filed March 14, 1966  3 Sheets-Sheet 2
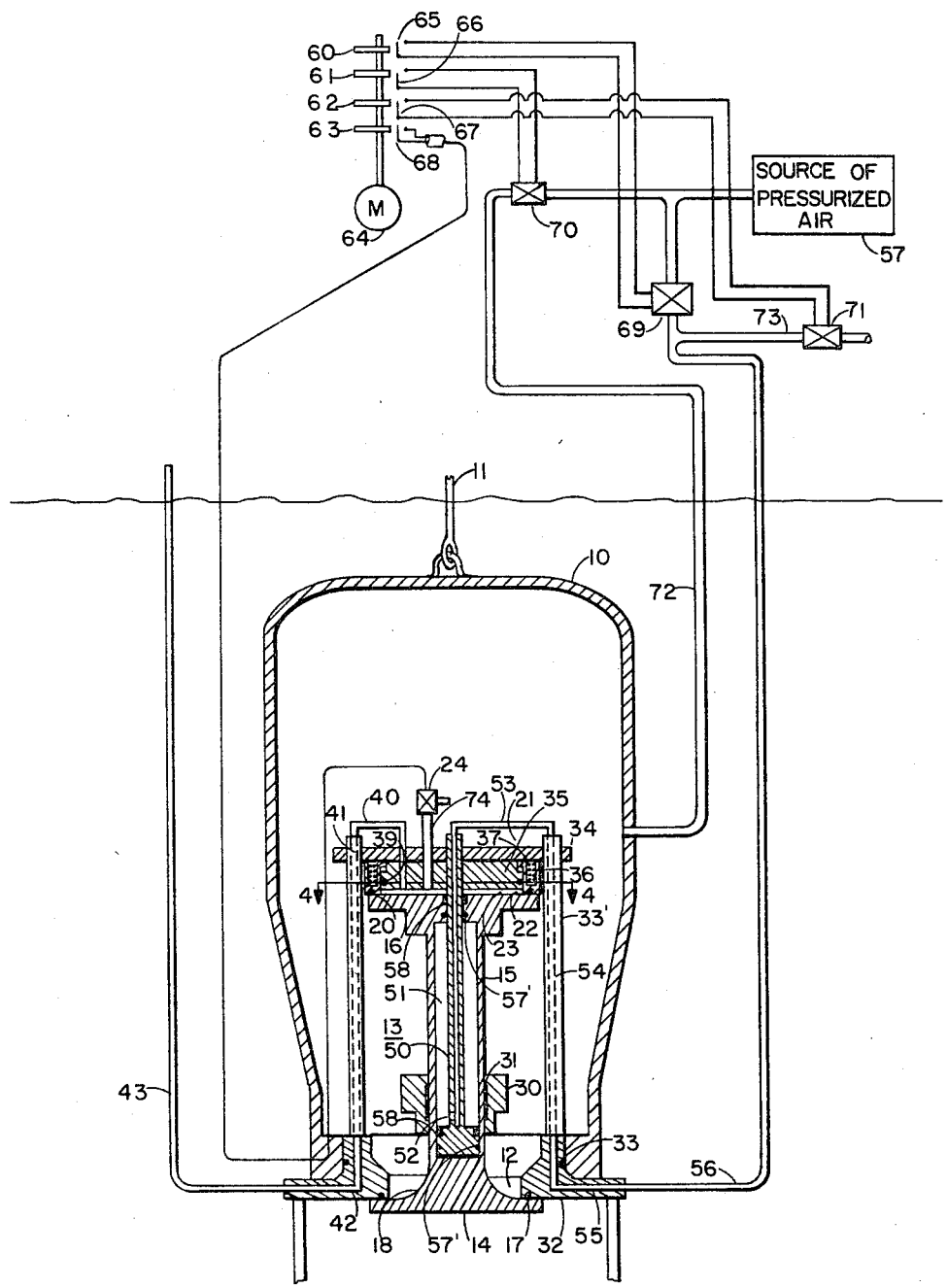
FIG III
INVENTOR
GEORGE B. LOPER
BY
Arthur F. Zobel

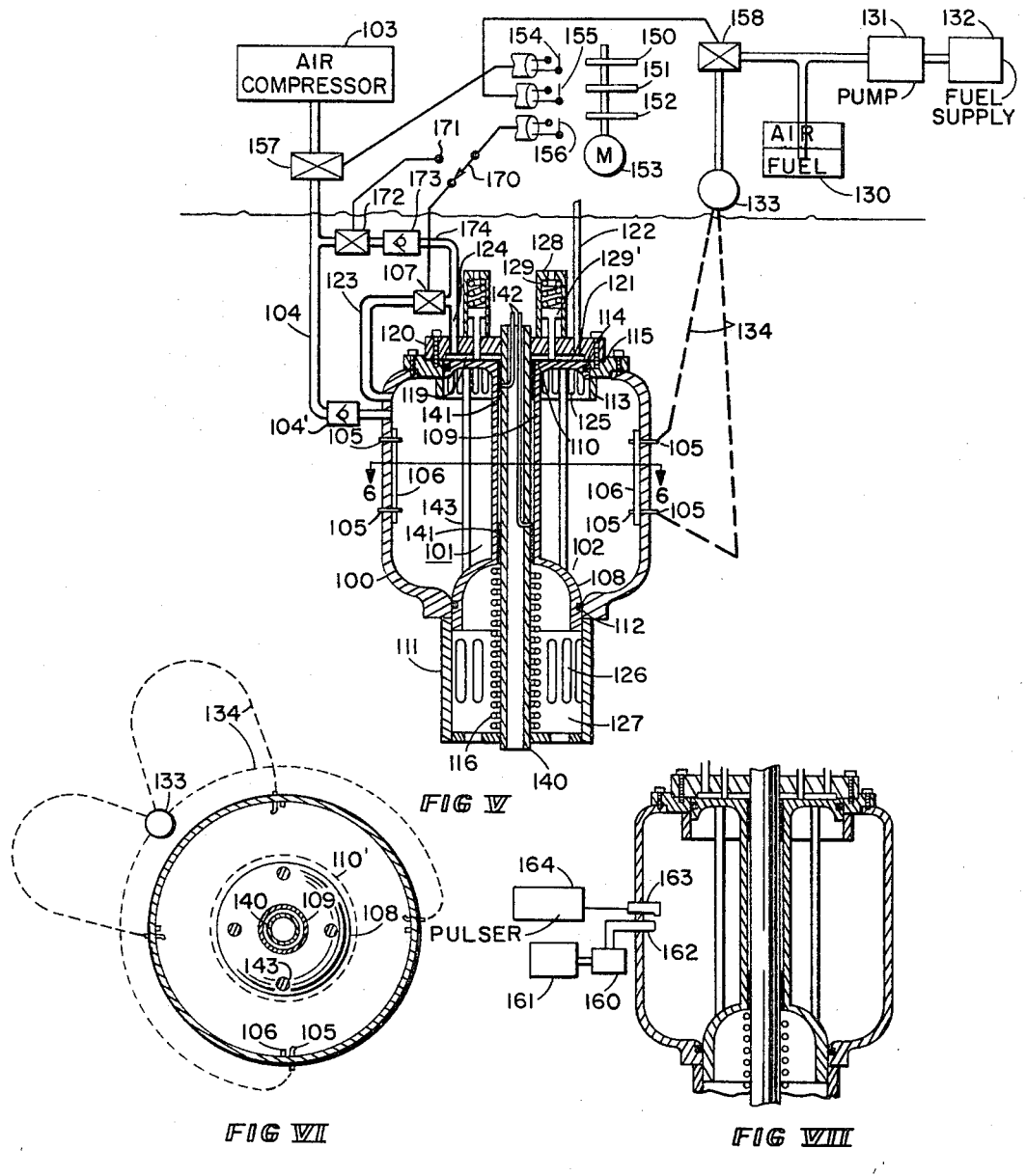

3,397,755
PNEUMATIC SEISMIC SOURCE
George B. Loper, Duncanville, Tex., assignor to Mobil Oil Corporation, a corporation of New York
Continuation-in-part of application Ser. No. 354,083, Mar. 23, 1964. This application Mar. 14, 1966, Ser. No. 534,130
19 Claims. (Cl. 181—.5)

ABSTRACT OF THE DISCLOSURE

The specification discloses a repetitive marine seismic source formed by a rigid chamber for confining high pressure gases and having a controllable spool-shaped valve for rapidly releasing the high pressure gases into the water to generate an acoustic pulse. The chamber may be pressurized by injecting only compressed air or by injecting compressed air and diesel fuel for forming a combustible mixture which is ignited.

---

This application is a continuation in part of application Ser. No. 354,083, filed March 23, 1964, now abandoned.

This invention relates to seismic surveying and more particularly to a seismic source useful in marine seismic surveying.

In seismic exploration of underwater formations, seismic disturbances are generated in water from a boat for the production of acoustic pulses which are reflected from subsurface interfaces and detected for the production of seismic record sections. In one system now in use, the seismic disturbances are generated by repetitively exploding a combustible mixture of air, pure oxygen, and propane in a reactor chamber having an open end coupled to water.

In accordance with the present invention, there is provided a unique seismic source useful in marine seismic surveying. The source comprises a primary chamber formed of rigid wall structure having a normally closed outlet end to be immersed in water. Valve means is provided for opening and closing the outlet end. In addition, means is provided for introducing a fluid in the chamber when the valve means is in a closed position to form a fluid pressure therein substantially greater than the hydrostatic pressure of the water at the outlet end. When the pressure within the chamber reaches a desired maximum value, the valve is actuated to open the outlet end to allow the pressurized fluid in the chamber to escape into the water to generate an acoustic pulse.

In one embodiment, the fluid employed for pressurizing the chamber is air. In a further embodiment, a combustible fluid such as diesel fuel is introduced in the chamber and ignited to create a high gas pressure in the chamber upon combustion. In the latter embodiment, the valve is actuated to open the outlet end when the pressure within the chamber increases to a desired maximum value above the hydrostatic pressure of the water following ignition.

The system of the present invention thus eliminates the need for pure oxygen and propane which are difficult to acquire in certain areas of the world where seismic exploration now is being carried out. The system of the present invention also has advantages in that it presents little if any fuel storage problem since air is readily available as well as diesel fuel from the boat's fuel supply.

In the system of the present invention as disclosed, the release of the pressurized gas from the chamber results in the formation of a large expanding gas bubble which encompasses the outlet end of the chamber. While the bubble still encompasses the outlet end, the valve is moved to a closed position to prevent water from subsequently entering the chamber. Thus, the chamber is maintained free of water and may be employed repetitively to generate acoustic pulses at short time intervals.

In accordance with a further aspect of the present invention, means is provided for employing the fluid pressure within the primary chamber to maintain the valve closed for a desired time period. In addition, means is provided for employing fluid pressure to actuate the valve means to open the outlet end.

In a more specific aspect, the valve comprises a spool-shaped member having first and second rims coupled together by an interconnecting member. At least the second rim of the valve is supported for movement within the primary chamber. Means is provided for moving the valve to a closed position wherein the first rim closes the outlet end of the chamber. In the closed position, at least a portion of the inner surface of the first rim forms a portion of the interior wall surface of the chamber and the outer surface thereof is exposed to the water. The area of the projection of the inner surface of the second rim onto a plane normal to the axis of the valve is greater than the area of the projection of the inner surface portion of the first rim onto the same plane. Thus, the second rim has a greater inner surface area than that of the first rim for the application of fluid pressure parallel to the valve axis. In addition, means is provided to form a second chamber with the outer surface of the second rim when the valve is closed. This chamber normally is maintained at a relatively low pressure. Thus, when the valve is moved to a closed position and the primary chamber is pressurized, a net force is exerted on the valve, by the fluid pressure, in a direction opposite the outlet end, thereby maintaining the valve closed. When it is desired to generate an acoustic pulse, the second chamber is exposed to an increased pressure. In this manner, additional force is applied to the valve to overcome the net force on the valve, mentioned above, thereby forcing the valve to an open position to release the pressurized gas from the primary chamber.

For further objects and advantages of the present invention and for a more complete understanding thereof, reference may be had now to the following detailed description taken in conjunction with the accompanying drawings wherein:

FIGURE 1 schematically illustrates a seismic source of the present invention;

FIGURE 2 illustrates curves useful in understanding the present invention;

FIGURE 3 illustrates in detail one embodiment of the present invention;

FIGURE 4 illustrates an enlarged cross section of the system of FIGURE 3 taken along the lines 4—4 thereof;

FIGURE 5 illustrates in detail another embodiment of the present invention;

FIGURE 6 illustrates in part a cross section of the system of FIGURE 5 taken along the lines 6—6 thereof; and FIGURE 7 illustrates a modification of the system of FIGURE 5.

Referring now to FIGURE 1, the seismic source of one embodiment of the present invention for generating acoustic pulses comprises a chamber 10 supported in water from a boat by cable 11 and having an outlet end 12 coupled to the water. A quick-opening valve, herein illustrated as spool-shaped valve 13, is provided for opening and closing the outlet end. Fluid is introduced in the chamber by means, not shown in FIGURE 1, to create a high fluid pressure within the chamber. At a desired time, the valve 13 is actuated to allow the pressurized fluid to escape into the water in a minimum of time. The pressure in the water thus quickly increases to a maximum value for the production of a pressure pulse, as illustrated at time *a* in FIGURE 2, and from which the acoustic pulse is derived.

In the system of FIGURE 1, the fluid injected is a gas, such as air injected under pressure, to create a high gas pressure within the chamber for the production of an acoustic pulse. In a further embodiment, to be described hereinafter, a combustible fluid such as diesel fuel is introduced in a closed chamber and ignited to create a high gas pressure within the chamber. A quick-opening valve is actuated to release the pressurized gas at a desired time following ignition for the production of an acoustic pulse. In the operation of the systems of these embodiments, a large gas bubble, illustrated at 13' in FIGURE 1, is formed subsequent to the release of the pressurized gas into the water. The formation of the bubble produces a negative pulse, as illustrated at time *b* in FIGURE 2, and normally a secondary pressure pulse, as illustrated at time *c* of curve A. As will be described hereinafter, means is provided for reducing the amplitude and frequency of the secondary pressure pulse as illustrated by curve B.

Referring again to FIGURE 1, the air pressure within the chamber is employed to maintain the valve in a closed position as the pressure increases to a desired maximum value and further to actuate the valve to open the outlet end. More particularly, the spool-shaped valve comprises a first rim 14 coupled by interconnecting member 15 to a second rim 16. The valve is moved to a closed position (by means not shown in FIGURE 1) wherein rubber O-ring and seat 17 engages the inner surface 18 of rim 14 to seal the outlet end. The inner diameter of O-ring 17 is slightly less than the diameter of the upper rim 16. Thus, rim 16 has a larger inner surface area for the application of fluid pressure parallel to the valve axis. When the valve is in a closed position, rubber O-ring and seat 20, provided in member 21, engages the upper surface 22 of rim 16 to form an annulus or chamber 23 sealed from chamber 10. The pressure within the chamber 23 normally is maintained (by means not shown in FIGURE 1) at a value less than the pressure within the chamber 10 and, in fact, near atmospheric pressure. Hence, as the chamber 10 is pressurized, a net upward force is exerted on the valve 13, thereby maintaining the valve in a closed position. When it is desired to generate an acoustic pulse, solenoid valve 24 is actuated to allow the pressurized gas within chamber 10 to pass into chamber 23. Thus, additional force is applied to the upper surface 22 of rim 16 to overcome the net upward force on the valve 13, thereby breaking the seal between the chamber and the valve. The pressurized air in chamber 10 then acts to force the valve 13 downward in a minimum of time and thus is rapidly released into the water to generate an acoustic pulse. Container 25 is provided to stop the valve after it has traveled downward sufficiently to allow the pressurized gas to escape. More, particularly, as the rim 14 of valve 13 approaches and enters container 25, the water therein acts to brake the movement of the valve.

Referring now to FIGURE 3, there will be described in more detail the system of FIGURE 1, wherein pressurized air is introduced in the chamber for the generation of acoustic pulses. Like elements have been given like character references as employed in FIGURE 1. The valve 13 is supported for reciprocation relative to chamber 10 by means including support member 30 and bearing means 31. O-ring 17 is supported in member 32 which forms the outlet end. This member, coupled to the lower end of the chamber 10, is provided for ease of assembly and disassembly of the system. O-ring 33 provides a seal between member 32 and the lower end of chamber 10.

The assembly 21 for supporting O-ring 20 is supported by rods 33' (also illustrated in FIGURE 4) and coupled to member 32. The assembly 21 comprises a first disk-shaped member 34 coupled to rods 33' and a second disk-shaped member 35 of smaller diameter and which extends below member 34 between rods 33'. The O-ring 20 is supported in a ring-shaped member 36, also illustrated in FIGURE 4, which is biased downward by a plurality of springs 37. These springs are positioned in apertures 38 (FIGURE 4) formed in member 36 and are provided to urge the member 36 and hence the O-ring 20 toward the top surface 22 of rim 16. This arrangement is provided to insure that the O-ring 20 engages surface 22 at the same time that O-ring 17 engages surface 18 even though the dimensions of the O-rings may change due to usage, thereby maintaining the proper seal between the O-rings and the respective surfaces. An O-ring 39 is provided between members 35 and 36 to maintain a seal therebetween.

When the valve 13 is in the closed position, the chamber 23 formed is vented to the atmosphere to prevent the pressure in chamber 23 from building up if leakage occurs between the seals. In this respect, a flow path extends from chamber 23 to the surface by way of conduit 40, aperture 41 formed in one of the rods 33', aperture 42 formed in member 32, and conduit 43 extending to the surface.

The system for moving the valve 13 to a closed position comprises conduit 50 fixedly secured to members 34 and 35 and extending downward into a chamber 51 formed in connecting member 15. Valve 13 moves relative to conduit 50 and is moved upward from a downward position by injecting compressed air into chamber 51 by way of conduit 50 and aperture 52. The compressed air pushes against the upper surface of chamber 51 to move the valve 13 upward. Air is injected into conduit 50 by way of a flow path comprising conduit 53, aperture 54 formed in one of the rods 33', aperture 55 formed in member 32, and conduit 56 extending to the surface to a compressed air source 57. O-rings 57' are provided in rim 16 and the bottom end of conduit 50 to maintain a proper seal between the conduit and valve 13. In addition, bearing members 58 are provided in rim 16 and the bottom end of conduit 50 to enable the valve 13 to slide relative to conduit 50.

The system preferably is cyclically operated whereby acoustic pulses are repetitively generated, for example, at a repetition rate of one pulse every six seconds. A plurality of cams 60–63 driven by motor 64 sequentially actuate switches 65–68 within each cycle to control the various components of the system to generate an acoustic pulse. The sequence of operation during a cycle now will be described assuming that an acoustic pulse has just been generated and that the valve 13 is in an open position. At this time, solenoid valve 24 within chamber 10 is closed as well as solenoid valves 69–71 employed for controlling the flow of air into and out of chamber 10.

As mentioned previously, the release of the pressurized air into the water results in the formation of a large air bubble and which completely encompasses the outlet end 12 of chamber 10. While the bubble still encompasses the outlet end 12 and prior to the time the bubble drifts away, the valve 13 is moved to a closed position to prevent the water from entering the chamber 10. More particularly, cam 60 first closes switch 65 to open valve 69 to allow pressurized air from supply 57 to pass into chamber 51 to move the valve 13 to a closed position. Cam 61 next closes switch 66 to open valve 70 to allow pressurized air from source 57 to flow, by way of conduit 72, into chamber 10. After the pressure within the chamber 10 is sufficient to maintain valve 13 in the closed position, cam 60 allows switch 65 to open, thereby stopping the flow of air into chamber 51. Simultaneously, or at a short time afterward, cam 62 closes switch 67 to open solenoid valve 71 to vent chamber 51 to the atmosphere by way of conduit 56, conduit 73, and open valve 71. When the pressure in chamber 10 increases to a desired maximum value, cam 61 allows switch 66 to open, thereby allowing valve 70 to close to stop the flow of air into chamber 10. In addition, cam 62 allows switch 67 to open to close valve 71. Finally, cam 63 closes switch 68 to open valve 24 in chamber 10 to allow pressurized gas to flow from the chamber 10, by way of conduit 74, into chamber 23 to actuate the valve for the generation of an acoustic pulse. The inner diameter of conduit 40 is smaller than that of conduit 74 and the opening of the valve 24. Thus, the pressure in chamber 23 builds up to a value sufficient to overcome the net upward force on valve 13, thereby breaking the seal between the chamber and the valve. The pressurized air in chamber 10 then forces the valve 13 downward in a minimum of time and is rapidly released into the water to generate an acoustic pulse.

In one embodiment, the valves 24 and 69–71 were spring-biased, solenoid-actuated valves. The rim 16 of valve 13 had a diameter of seven inches. The O-ring 17 had an inside diameter of 5⅞ inches and an outside diameter of 6⅛ inches. The outside diameter of connecting member 15 was two inches. In addition, the O-ring 20 had an inside diameter of 6¾ inches and an outside diameter of seven inches. The outside diameter of conduit 50 was of the order of ¾ of an inch. The capacity of chamber 10 was of the order of 1.3 cubic feet. With this arrangement, the chamber 10 may be pressurized to a value of the order of 300 pounds per square inch over atmospheric pressure for the production of an acoustic pulse.

As mentioned previously, means is provided to reduce secondary pressure pulses which normally would occur upon oscillation of the gas bubble formed subsequent to the release of the pressurized gas into the water. One system which may be employed to reduce secondary pressure pulses is disclosed and claimed in my copending application Ser. No. 574,244, filed Aug. 22, 1966, which is a continuation of application Ser. No. 353,874, filed Mar. 23, 1964, now abandoned, entitled System and Method for Marine Seismic Surveying and assigned to the same assignee as the present invention. This system will be described briefly in connection with FIGURE 1 and comprises a plurality of conduits 80 provided to present flow paths between the bubble formed and the surface. The upper ends 81 of conduits 80 are open to the surface and the lower ends 82 are positioned to break into the bubble as it expands. Valves 83 are provided normally to maintain the lower ends closed to maintain the conduits 80 substantially free of water. The valves are opened when the bubble encompasses the lower ends of the conduits to present a plurality of flow paths between the bubble and the surface to prevent the formation of high pressures in the bubble subsequent to expansion.

At certain depths at which seismic disturbances are generated in seismic exploraiton, the internal pressure of the bubble decreases below atmospheric pressure. Under these conditions, valves 83 are opened when the internal pressure of the bubble decreases to a certain value below atmospheric pressure to allow air from the surface to pass into the bubble. In this manner, the amplitude of bubble oscillation is reduced thereby reducing secondary pressure pulses.

As described in my copending application, mentioned above, springs are provided to control the opening and closing of the valves. Referring to one of the conduits 80 (FIGURE 1), valve 83 is pivoted at 84 and biased to a closed position by spring 85. When the pressure in the bubble 13' decreases to a certain value below atmospheric pressure, the pressure on the top surface of the valve becomes sufficient to overcome the upward force applied by the spring to push the valve to an open position.

Referring now to FIGURE 5, there will be described another embodiment of the present invention wherein a combustible fluid such as diesel fuel is introduced in a chamber 100 and ignited to create a high gaseous pressure therein upon combustion. When the pressure reaches substantially a maximum value, a quick-opening, spool-shaped valve 101 is actuated to open the outlet end 102 of the chamber to allow the pressurized gas to escape into the wter to generate an acoustic pulse.

In the system of the present invention, diesel fuel preferably is employed since it is readily available and can be utilized to create very high pressures for the production of acoustic pulses. In the system of FIGURE 5, diesel fuel and air are separately injected into the chamber 100 where a combustible mixture is formed and ignited. Compressed air first is injected into the chamber from air compressor 103 by way of conduit 104 and check valve 104'. Next, diesel fuel under pressure is sprayed into the chamber, for a short period of time, from a plurality of nozzles 105 also illustrated in FIGURE 6. The diesel fuel is mixed with the pressurized air in the chamber to form a combustible mixture which is ignited by heating elements 106. Upon ignition of the combustible mixture of diesel fuel and air, the pressure within the chamber increases. As the pressure increases to a maximum value, solenoid valve 107 is opened to actuate the spool-shaped valve 101 for the generation of an acoustic pulse as now will be described.

Spool-shaped valve 101 has a lower rim or piston-type head 108 coupled by connecting member 109 to an upper rim or piston-type head 110. The lower head 108 reciprocates in a lower piston cylinder 111 and has a metal seal ring 112 coupled thereto to form a seal between the outlet end 102 of chamber 100 and valve 101 when the valve is in a closed position. Similarly, the upper head 110 reciprocates in an upper piston cylinder 113 and has a metal seal ring coupled thereto to form a seal between member 115 of chamber 100 and the upper head when the valve is closed. The upper head 110 is of slightly larger diameter than the lower head 108, thereby having a larger inner surface area for the application of fluid pressure parallel to the valve axis. The relative diameters of the two heads are shown more clearly in FIGURE 6 wherein the outer boundary of upper head 110 is illustrated by dotted line 110' for comparative purposes. A return spring 116 is provided to urge the valve 101 toward a closed position as will be described hereinafter. When the valve is closed, an annulus or chamber 119 sealed from chamber 100 is formed between the top flange 120 and the upper surface 121 of the upper head 110. This annulus or chamber is vented to the atmosphere by small conduit 122. Thus, when the chamber is pressurized and the valve 101 is closed, there will be a net upward force on the valve which tends to hold the valve in a closed position. As the pressure within chamber 100 reaches its peak value upon ignition of the combustible mixture of fluids introduced therein, solenoid valve 107 is opened to allow pressurized gas within chamber 100 to be applied by way of conduits 123 and 124 into the annulus 119. When the pressure in annulus 119 becomes sufficient to overcome the return spring force and the force created because of the different valve head sizes, the valve 101 will start to move in a downward direction. In addition, when the seal ring on the upper valve head 110 passes over the ports 125 formed in the upper piston cylinder 113, the pressure on both sides of the valve head will be more or less equalized. Thus, a large downward force is exerted on the valve 101 by the pressurized gas in the chamber. As the seal ring on the lower piston head passes over the vent ports 126 formed in the lower piston cylinder, the pressure in the chamber 100 is released into the water for the production of an acoustic pulse. The valve is stopped by a hydraulic shock absorber comprising braking container 127 and is pushed closed by return spring 116. Hydraulic shock absorbers comprising chambers 128, springs 129, and members 129' provided at the top slow the valve return while closing.

The system for injecting diesel fuel into chamber 100 by way of nozzles 105 comprises an accumulator 130 into which diesel fuel is pumped under pressure by pump 131 coupled to fuel supply 132. Accumulator 130 in turn is coupled to nozzles 105 by way of manifold 133 and conduits 134, also illustrated in FIGURE 6. The pressurized diesel fuel is injected into chamber 100 only for a short time period to form a desired combustible mixture. Conduits 134 all have the same lengths to insure that the same amount of fuel is injected simultaneously through all of the nozzles 105.

In a further description of the system, support conduit 140 is provided to additionally support the valve 101 as well as return spring 116. Bearing members 141 are provided between support conduit 140 and connecting member 109. Lubricating fluid is circulated between bearing members by conduits 142. Support rods 143 are coupled between the lower and upper heads of the valve 101 for additional strentgh.

As in the system of FIGURE 3, the system of FIGURE 5 is cyclically actuated to repetitively generate acoustic pulses. Within each cycle, cams 150–152, driven by a motor 153, actuate switches 154–156 to control the various components to generate an acoustic pulse. The sequence of operation during a cycle now will be described assuming that an acoustic pulse has just been generated and that the valve 101 has returned to a closed position. At this time, solenoid-actuated valve 107 is closed as well as solenoid-actuated valves 157 and 158 employed for controlling the operation of the system.

In the generation of an acoustic pulse, cam 150 first closes switch 154 to open valve 157 for a predetermined period of time, thereby allowing compressed air to flow into chamber 100. Next, cam 151 actuates switch 155 to open valve 158 for a preset period of time, which may be of the order of one-fourth of a second, after which time it closes. As mentioned previously, diesel fuel under pressure is sprayed into the chamber 100 through nozzles 105 where it is mixed with pressurized air and ignited by heating elements 106. As the pressure increases to a desired maximum value, the time of which is determined by experiment, cam 152 closes switch 156 to open solenoid valve 107 for a short preset period of time. Valve 101 thus is actuated to allow the pressurized gas in the chamber to escape into the water for the production of an acoustic pulse as described previously. After the acoustic pulse has been generated, return spring 116 pushes the valve 101 to a closed position. This occurs while the resulting bubble encompasses the outlet end 102 of chamber 100 and prior to the time that the bubble drifts away.

In the system of FIGURE 5, the production in the chamber of pressures up to 500 pounds per square inch over atmospheric pressure is desirable for the generation of acoustic pulses. The chamber 100 and valve 101 preferably are formed of stainless steel. The heating elements 106 disclosed may be electric coils which are continuously energized. Suitable means may be provided to flush the chamber of exhaust gases. For example, after valve 101 has closed and while valve 157 has opened during the next cycle, other valve mechanism coupled to chamber 100 (not shown) may be opened for a short time period to allow the fresh air to flush out the exhaust gases.

In the embodiment of FIGURE 5, a mechanical spring 116 was disclosed as being employed for moving valve 101 to close the outlet end of chamber 100 after the generation of an acoustic pulse. It is to be understood, however, that an arrangement of the type disclosed in the embodiment of FIGURE 3 utilizing compressed air, may be employed instead to move the valve 101 to a closed position. Such an arrangement could include a cylinder coupled to the valve 101 into which compressed air is introduced for moving the valve upward and closed after the generation of an acoustic pulse. Suitable conduits and valve control arrangements would be employed for controlling the introduction and release of pressurized air into and from the cylinder as can be understood from the system disclosed in FIGURE 3.

In the acoustic source described above in connection with FIGURE 5, the gas pressure within the chamber 100 was employed to actuate the valve 101 in the generation of the acoustic pulse. It is to be understood that pressurized air, derived from supply formed by conduit 104 and air compressor 103, may be employed instead to actuate valve 101. In this alternative, electrical switch 170 is moved to contact terminal 171 whereby a valve 172 rather than valve 107 will be controlled by switch 156. When valve 172 is opened during the operating cycle, compressed air from conduit 104 is applied to annulus 119 by way of check valve 173 and conduits 174 and 124.

The air compressor 103 employed has a capacity sufficient to pressurize the chamber 100 up to 100 pounds per square inch during each operating cycle prior to the application of diesel fuel. In addition, the conduit 104 employed has a relatively large volume in that its length is of the order of 50 feet and the internal diameter is about two inches. Thus, sufficient pressure will be maintained in conduit 104 after valve 157 is closed, for application to annulus 119, to overcome the net upward force on valve 101 whereby it will be moved down to allow the high pressure within the chamber 100 to act on the top surface 121 of valve 101.

Referring now to FIGURE 7, there will be described a modification of the system of FIGURE 5 wherein air and diesel fuel sequentially are injected into the chamber 100 to form a combustible mixture which is ignited by a spark plug arrangement. More particularly, as in the system of FIGURE 5, pressurized air first is injected into the chamber. Next, diesel fuel is sprayed into the chamber by nozzles 105 for a short period of time. At the termination of the diesel fuel injection, valve 160 is opened to allow a combustible gas, such as pressurized propane gas from supply 161, to flow by way of nozzle 162 into chamber 100. Simultaneously, with the actuation of valve 160 or shortly thereafter, spark plug 163 is actuated by pulser 164 to ignite the propane gas to obtain a temperature sufficient to ignite the combustible mixture of diesel fuel and air. Solenoid valve 107 or 172 (FIGURE 5) is actuated in a manner similar to that described in the operation of the system illustrated in FIGURE 5 to actuate the valve 101 to allow the pressurized gas in the chamber to escape into the water for the generation of an acoustic pulse.

Although only one spark plug arrangement is illustrated in FIGURE 7, a plurality of spark plugs and propane nozzles may be employed and actuated simultaneously to increase the burning rate and hence the pressure in the chamber 100.

In the system of FIGURES 5–7, diesel fuel and air were disclosed as being separately injected into the chamber to form a combustible mixture therein. It is to be understood, however, that the combustible mixture may be formed first and then injected into the chamber for ignition, for example, by the system disclosed in FIGURE 7.

Now that the invention has been described with certain embodiments, modifications will become apparent to those skilled in the art, and it is intended to cover such modifications as fall within the scope of the appended claims.

What is claimed is:

1. An acoustic source for generating acoustic pulses in water for exploratory purposes comprising:

an annular chamber formed of means including rigid outer wall structure and having a first end and outlet port means spaced from said first end to be coupled to water, valve means including a release member supported for movement in a first direction away from said first end to an open position for opening said port means and in an opposite direction toward said first end to a closed position for closing said port means, means for introducing a fluid in said chamber when said valve means is in a closed position to form a high gas pressure in said chamber including a portion of said chamber between said first end and said outlet port means, means for actuating said valve means suddenly to move said valve means to said open position to open said outlet port means to allow the pressurized gas in said portion of said chamber to be released rapidly into the water to generate an acoustic pulse, said valve means including an elongated tubular member defined by tubular wall structure extending from said release member and supported for concurrent movement within the confines of said outer wall structure forming said chamber, and retract means disposed within said tubular member for developing valve retract forces wholly within said tubular member for application to said valve means to move said valve means to said closed position following the generation of an acoustic pulse.

2. The acoustic source of claim 1 comprising:

wall structure means, said valve means having a first surface facing said wall structure means and movable toward and away from said wall structure means upon movement of said valve means to said opposite and first directions, respectively, seal means comprising resilient means at least a portion of which is located between said wall structure means and said first surface for compression in one of said directions upon movement of said valve means in said opposite direction to said closed position to form a pressure seal between said first surface and said wall structure means forming a control region unexposed to said high gas pressure in said chamber, said control region being formed within the volume defined by said wall structure means, said first surface of said valve means, and said seal means, said seal means defining the outer limits of said control region, said valve means having means to which pressure is applied in said opposite direction to urge said valve means toward said wall structure means to effect said pressure seal to form said control region sealed from high gas pressure within said chamber, and means for increasing the gas pressure within said control region to move said valve means to a position to eliminate said pressure seal and allow said high gas pressure to move said valve means rapidly to said open position.

3. In an acoustic source for generating high energy acoustic pulses in water for exploratory purposes having:

means including rigid outer wall structure forming a pressure chamber within which there may be developed high gas pressures and including an outlet port means, valve means including a release member supported for movement in a first direction from a position closing said outlet port means to an open position for release of said gas pressure, the improvement which comprises:

a control element, an elongated rigid tubular member interconnecting said release member and said control element, said control element having a first surface facing in the direction of said outlet port means and an opposite surface facing in the opposite direction, the effective area of said first surface of said control element exposed to said gas pressure being greater than that of said release member, releasing means for said release member comprising a peripheral portion of said opposite surface of said control element and associated wall structure forming therebetween a control region sealed from said high gas pressure when said release member is in its closed position, said elongated tubular member being defined by tubular wall structure forming a hollow interior region extending at least from adjacent said release member to adjacent said control element, said tubular member including said hollow region being supported for movement within the confines of said outer wall structure forming said chamber, the greater area of said control element exposed to said high gas pressure biasing said release member and said control element to their closed positions, means for increasing the pressure within said control region for concurrent movement of said release member and of said control element for high speed movement of both to their open positions by said high gas pressure, and retract means disposed within said hollow region and located to be surrounded by said tubular wall structure and supported at least in part within the confines of said outer wall structure forming said chamber for moving said release member and said control element to their closed positions after each operation from their open positions.

4. The acoustic source of claim 3 wherein:

said associated wall structure is substantially closed and has a surface area defining the upper boundary of said control region, said opposite surface of said control element facing said associated wall structure and movable away from and toward said associated wall structure upon movement of said valve means in said first direction and in an opposite direction to said closed position, respectively, said opposite surface forming the lower boundary of said control region when said valve means is in said closed position, means utilized for moving said valve means in said opposite direction to said closed position, a substantially ring-shaped contact seal means comprising resilient means at least a portion of which is located between said associated wall structure and said opposite surface for compression in one of said directions upon movement of said valve means in said opposite direction to said closed position to form a pressure seal between said opposite surface and said associated wall structure forming said control region unexposed to high pressure in said chamber, said pressure seal surrounding a portion of said opposite surface and said surface area of said associated wall structure defining the outer boundary of said control region, the increase in pressure within said control region causing said valve means to move away from said surface area to eliminate said pressure seal and to expose said control region and hence said portion of said opposite surface to high gas pressure to apply high gas pressure to an increased area of said valve means for high speed movement of said valve means to said open position by said high gas pressure to allow said high gas pressure in said portion of said chamber to be released rapidly into the water to generate an acoustic pulse.

5. The acoustic source of claim 3 wherein:

said retract means disposed within said hollow region develops valve retract forces wholly within said tubular wall structure for application to said valve means for movement of said release member and said control element to their closed positions after each operation from their open positions.

6. An acoustic source for generating acoustic pulses in water for exploratory purposes comprising:

a high pressure chamber having a first end and outlet port means spaced from said first end to be coupled to water, valve means including a release member supported for movement in a first direction away from said first end to an open position for opening said port means and in an opposite direction toward said first end to a closed position for closing said outlet port means, means for introducing a fluid in said chamber when said valve means is in a closed position to form a high gas pressure in said chamber including a portion of said chamber between said first end and said outlet port means, wall structure means having a surface area defining the upper boundary of a control region, said valve means having a first surface facing said wall structure means and movable toward and away from said wall structure means upon movement of said valve means in said opposite and first directions, respectively, said first surface forming the lower boundary of said control region when said valve means is in a closed position, means utilized for moving said valve means in said opposite direction to a closed position for closing said outlet port means and for forming said control region between said surface area and said first surface unexposed to said high gas pressure in said chamber.

a substantially ring-shaped contact seal means comprising resilient means at least a portion of which is located between said wall structure means and said first surface for compression in one of said directions upon movement of said valve means in said opposite direction to said closed position to form a pressure seal between said first surface and said wall structure means, said pressure seal surrounding a portion of said first surface and said surface area of said wall structure means and defining the outer boundary of said control region, control means for increasing the pressure within said control region to move said valve means away from said surface area to expose said control region and hence said portion of said first surface to said high gas pressure to apply said high gas pressure to an increased area of said valve means for high speed movement of said valve means to said open position by said high gas pressure to allow said high gas pressure in said portion of said chamber to be released rapidly into the water to generate an acoustic pulse.

7. An acoustic source for generating acoustic pulses in water for exploratory purposes comprising:

a chamber formed of means including rigid outer wall structure and having a first end and an outlet port means spaced from said first end to be coupled to water, movable valve means including a release member supported for opening and closing said outlet port means, means for injecting pressurized air into said chamber, a plurality of fuel injectors disposed in spaced relation around the periphery of said chamber in two spaced planes between said first end and said outlet port means for introducing into said chamber a plurality of streams of fuel for mixture with said air to form a combustible mixture in said chamber, each plane having a plurality of igniting means located therein, said igniting means in each plane being spaced one from the other and from said fuel injectors and disposed around the periphery of said chamber for igniting at a plurality of locations said combustible mixture to form hot gases of high pressure within said chamber, said valve means having structural means including a control means supported within the confines of said outer wall structure forming said chamber and extending from said release member to a position adjacent said first end of said chamber and exposed to said high gas pressure when said valve means is in a closed position, and means for actuating said valve means after ignition of said gases suddenly to move said valve means to open said outlet port means to allow the high pressure gas in said chamber to be released rapidly into the water to generate an acoustic pulse.

8. The acoustic source of claim 7 wherein:

said fuel injectors comprise diesel fuel injectors having end portions for directing the diesel fuel into the unobstructed space of said chamber.

9. An acoustic source for generating acoustic pulses for exploratory purposes while immersed in a body of water, the outer wall structure being in contact with the water and having water extending centrally therethrough when said source is immersed in water comprising:

an annular chamber formed by said outer wall structure and centrally extending tubular wall structure through which a column of water extends when said source is immersed in water, said chamber having an outlet port, said tubular wall structure including valve means for opening and closing said port, means for introducing a fluid into said annular chamber when said valve is in a closed position to form a high gas pressure in said chamber greater than the hydrostatic pressure of the water at said outlet port, and means for actuating said valve means suddenly to move said valve means to open said outlet port to allow the pressurized gas in said chamber to be released rapidly from said outlet port to generate an acoustic pulse.

10. The acoustic source of claim 9 in which there is provided:

means for introducing a combustible fluid into said annular chamber, and means for igniting said combustible fluid to form hot gases of high pressure in said annular chamber, which annular chamber has said column of water passing through its central portion and is surrounded by water when said source is immersed in water.

11. An acoustic source for generating acoustic pulses in water for exploratory purposes comprising:

a chamber having a first end, a spaced second end, and enclosing wall structure therebetween defining the outer limits of a chamber region within said enclosing wall structure, said second end having an outlet port to be coupled to water, valve means supported for opening and closing said port, said valve means being cooperative with structure for forming a sealed annular chamber region with a central region extending therethrough for receiving and containing water when said source is placed in water and said valve means is in a closed position, said valve means including a tubular member extending centrally into said enclosing wall structure to form said sealed annular chamber when said valve means is in a closed position, means for introducing a fluid in said annular chamber region when said valve is in a closed position to form a high gas pressure in said chamber region greater than the hydrostatic pressure of the water at said outlet port, and means for actuating said valve means suddenly to move said valve means to open said outlet port to allow the pressurized gas in said chamber region to be released rapidly into the water to generate an acoustic pulse.

12. An acoustic source for generating acoustic pulses in water for exploratory purposes comprising:

a chamber having first and second axially aligned ends and an outer wall structure intermediate said ends defining the outer limits of a pressure chamber region within said outer wall structure, said second end having an outlet port, movable valve means having a first end for opening and closing said outlet port, said valve means including a centrally located tubular member, means for introducing fluid including combustible fluid into said chamber when said valve means is in a closed position, means for igniting said combustible fluid to form hot gases of high pressure in said chamber region, means for supporting said tubular member of said valve in an axial position within the confines of said outer wall structure of said chamber when said valve means is in a closed position to provide a water receiving region which extends interiorly of said outer wall structure of said chamber and is in communication with and exposed to water when said source is placed in water, and means for actuating said valve means suddenly to move said valve means to open said outlet port to allow the pressurized gas in said chamber region to be released rapidly from said outlet port to generate an acoustic pulse.

13. An acoustic source for generating acoustic pulses in water for exploratory purposes while immersed in water comprising:

a chamber having a first end, a spaced second end, and outer wall structure intermediate said ends defining a pressure chamber region within said outer wall structure, said second end having an outlet port to be coupled to water, movable valve means for opening and closing said outlet port, means for introducing fluid in said chamber region when said valve means is in a closed position to form a high gas pressure in said chamber region greater than the hydrostatic pressure of the water at said outlet port, said valve means including elongated structure having an aperture extending therethrough in the longitudinal direction, means for supporting a portion of said valve means including said elongated structure within the confines of said outer wall structure of said chamber when said valve means is in a closed position to provide a region within said aperture which extends through said pressure chamber region for receiving and containing water when said source is immersed in water, said elongated structure of said valve serving as a portion of the gas pressure confining wall structure of said pressure chamber region when said valve means is in a closed position, and means for actuating said valve means suddenly to move said valve means to open said outlet port to allow the pressurized gas in said chamber region to be released rapidly into the water to generate an acoustic pulse.

14. The acoustic source of claim 13 comprising:

means for introducing a combustible fluid into said chamber region, and means for igniting said combustible fluid to form hot gases of high pressure in said chamber region which is formed between said elongated structure providing said extending water receiving region and said outer wall structure.

15. The acoustic source of claim 14 comprising:

a plurality of fuel injectors and igniters spaced around said outer wall structure of said chamber, one of each of said fuel injectors being positioned to inject fuel toward one of said igniters to ignite said fuel at a plurality of locations in said chamber.

16. The acoustic source of claim 13 wherein:

said valve includes a release member for opening and closing said outlet port and structure extending from said release member and movable therewith including a tubular member interconnecting a control member with said release member, said aperture extending axially through said release member, said tubular member, and said control member, said support means axially supporting said extending structure including said tubular member within the confines of said outer wall structure of said chamber when said valve means is in a closed position to provide an annular chamber region sealed from water whose inner walls are defined by said tubular member and a central region within said aperture extending through said annular chamber region for receiving and containing water when said source is immersed in water.

17. The acoustic source of claim 16 comprising:

a plurality of fuel injectors and igniters spaced around said outer wall structure of said chamber, one of each of said fuel injectors being positioned to inject fuel toward one of said igniters to ignite said fuel at a plurality of locations in said chamber.

18. The acoustic source of claim 17 wherein:

said fuel injectors are disposed in spaced relation around the periphery of said chamber in two spaced planes between said first end and said outlet port means, each plane having a plurality of igniting means located therein, said igniting means in each plane being spaced one from the other and from said fuel injectors and disposed around the periphery of said chamber.

19. An acoustic source for generating acoustic pulses in water for exploratory purposes comprising:

a chamber formed of rigid wall structure having a first end and an outlet port means spaced from said first end to be coupled to water, movable valve measn including a release member supported for opening and closing said outlet port means, means for injecting pressurized air into said chamber, a plurality of fuel injectors disposed in spaced relation around the periphery of said chamber in two spaced planes between said first end and said outlet port means for introducing into said chamber a plurality of streams of fuel for mixture with said air to form a combustible mixture in said chamber, each plane having a plurality of igniting means located therein, said igniting means in each plane being spaced one from the other and from said fuel injectors and disposed around the periphery of said chamber for igniting at a plurality of locations said combustible mixture to form hot gases of high pressure in said chamber, and means for actuating said valve means after ignition of said gases suddenly to move said valve means to open said outlet port means to allow the high pressure gas in said chamber to be released rapidly into the water to generate an acoustic pulse.

References Cited

UNITED STATES PATENTS

| | | | |
|---|---|---|---|
| 1,789,209 | 1/1931 | Asbury | 251—337 |
| 2,846,019 | 8/1958 | Lang | 181—.5 |
| 3,039,439 | 6/1962 | Murek | 91—25 |
| 3,048,816 | 8/1962 | Lubnow | 181—.5 |
| 3,058,540 | 10/1962 | Simpson | 181—.5 |
| 3,118,348 | 1/1964 | Kline | 91—25 |
| 3,176,787 | 4/1965 | Roever | 181—.5 |
| 3,249,177 | 5/1966 | Chelminski | 181—.5 |
| 3,276,534 | 10/1966 | Ewing et al. | 181—.5 |
| 3,289,784 | 12/1966 | Cassand et al. | 181—.5 |
| 3,310,128 | 3/1967 | Chelminski | 181—.5 |
| 3,322,232 | 5/1967 | Chalmers et al. | 181—.5 |

BENJAMIN A. BORCHELT, *Primary Examiner.*

W. KUJAWA, *Assistant Examiner.*